April 8, 1924. 1,489,603
G. KRAČHT
CORNCUTTER
Filed Oct. 14, 1920
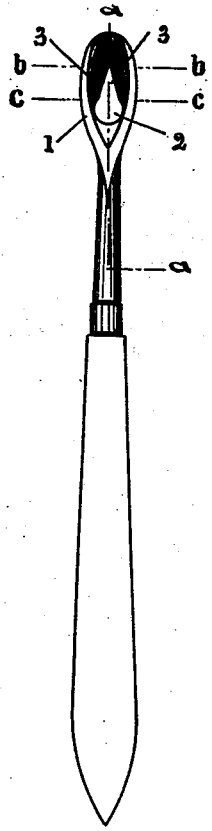
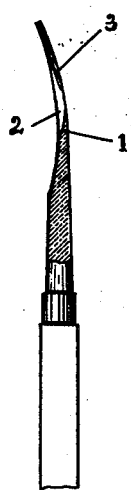
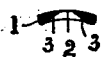
Witnesses:
Inventor:
Gustav Kračht Patented Apr. 8, 1924.

1,489,603

UNITED STATES PATENT OFFICE.

GUSTAV KRACHT, OF SOLINGEN, GERMANY.

CORNCUTTER.

Application filed October 14, 1920. Serial No. 417,036.

*To all whom it may concern:*

Be it known that I, GUSTAV KRACHT, a citizen of the German Republic, and residing at Solingen, Germany, have invented certain new and useful Improvements in Corncutters, of which the following is a specification.

This invention relates to an improved corn-cutter comprising a concave convex blade having an aperture bounded by two substantially straight converging cutting edges which meet in an acute angle, the diverging ends of the cutting edges being connected by a blunt semicircular edge.

In the accompanying drawing: Fig. 1 is an underside view of the improved corn-cutter, while Figs. 2, 3 and 4 are sections on the lines *a—a*, *b—b*, and *c—c*, of Fig. 1, respectively.

The concave convex blade 1 is supported by a handle *x* and provided with an aperture 2 bounded by two substantially straight converging cutting edges 3 which meet in an acute angle, the diverging ends of the cutting edges being connected by a blunt semicircular edge. For its use, the corn-cutter is with the underside of its blade 1 put on the corn to be cut and pressed thereon, so that the corn lies within the aperture 2 of the same. Upon the corn-cutter being then smoothly pulled in such direction that the acute angle formed by the cutting edges moves toward the corn, the latter is cut-off without pain to the patient.

What I claim, is:—

In a corn-cutter, the combination of a concave convex blade having an aperture bounded by two substantially straight converging cutting edges which meet in an acute angle, and a blunt semicircular edge connecting the diverging ends of the cutting edges, substantially as set forth.

In testimony whereof I have hereunto set my hand in the presence of two subscribing witnesses.

GUSTAV KRACHT.

Witnesses:
 MOSE NOELEN,
 LUCIE VENHOFF.